United States Patent [19]

Goebel et al.

[11] 4,326,011

[45] Apr. 20, 1982

[54] HOT CORROSION RESISTANT COATINGS

[75] Inventors: Joseph A. Goebel, Rocky Hill; Richard H. Barkalow; Nicholas E. Ulion, both of Marlborough, all of Conn.

[73] Assignee: United Technologies Corporation, Hartford, Conn.

[21] Appl. No.: 120,248

[22] Filed: Feb. 11, 1980

[51] Int. Cl.$^3$ ............................................. B32B 15/04
[52] U.S. Cl. ................... 428/641; 428/678; 428/679; 428/680; 428/685; 428/941
[58] Field of Search .................. 428/641, 652-654, 428/678-685, 941; 148/31.5, 6.3, 6.35; 427/248.1, 255.2, 250, 252

[56] References Cited

U.S. PATENT DOCUMENTS

| 3,493,476 | 2/1970 | Lucas et al. | 428/680 |
|---|---|---|---|
| 3,837,894 | 9/1974 | Tucker, Jr. | 428/632 |
| 3,873,347 | 3/1975 | Walker et al. | 427/250 |
| 3,874,901 | 4/1975 | Rairden | 427/250 |
| 4,005,989 | 2/1977 | Preston | 428/628 |
| 4,054,723 | 10/1977 | Higginbotham et al. | 428/680 |
| 4,086,391 | 4/1978 | Giggins, Jr. et al. | 428/628 |

FOREIGN PATENT DOCUMENTS

| 7675 | 2/1980 | European Pat. Off. | 428/678 |
|---|---|---|---|
| 2843110 | 4/1977 | Fed. Rep. of Germany | 428/680 |
| 2745812 | 4/1979 | Fed. Rep. of Germany | 428/678 |
| 55-82768 | 6/1980 | Japan | 427/253 |

OTHER PUBLICATIONS

Amerongen, H.; *Structure And Properties Of Silicide Based Diffusion Coatings*, The Netherlands, pp. 209–224.
Felix, P. C., et al; *CVD-Silicon Coatings For The Corrosion Protection Of Turbine Blades*, Sulzer Brothers, Ltd., Switzerland, pp. 600–617.
Wachtell, R. L.; "The Basic Principles Of Diffusion Coating", pp. 105–118.
Stringer, J.; "Hot Corrosion Of High-Temperature Alloys", *Ann. Rev. Mater. Sci.* pp. 477–509, vol. 7, (1977).

*Primary Examiner*—Michael L. Lewis
*Attorney, Agent, or Firm*—Charles E. Sohl

[57] ABSTRACT

A coated article and method for producing the coated article are described. The article is provided with a coating system which provides protection against hot corrosion at moderate temperatures (1200°–1700° F.). An overlay coating based on a metal selected from the group consisting of iron, nickel or cobalt or mixtures thereof and containing chromium and optionally aluminum, yttrium and/or hafnium is applied to the article to be protected. A silicon rich surface zone is produced at the surface of the overlay coating. Methods including pack cementation and physical vapor deposition are described for producing the coating.

8 Claims, 1 Drawing Figure

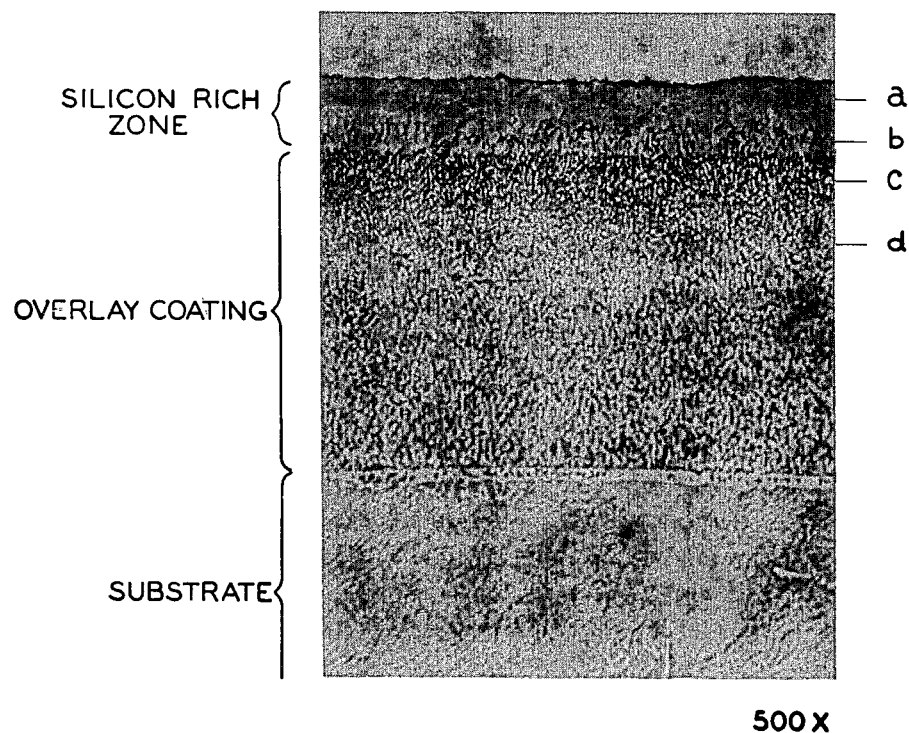

4,326,011

HOT CORROSION RESISTANT COATINGS

TECHNICAL FIELD

This invention relates to the field of hot corrosion resistant coatings for superalloys. The coating and method described in the present application are useful for the application of coatings which are resistant to hot corrosion at moderate temperatures. Such coatings are useful in gas turbine engines and in certain industrial applications.

BACKGROUND ART

Materials in gas turbine engines must have both exceptional elevated temperature mechanical properties and resistance to surface degradation such as oxidation and hot corrosion at elevated temperatures.

In current gas turbines temperatures range in excess of 2500° F., and it is desired that such engines operate for periods in excess of 10,000 hours without undergoing significant materials deterioration. To meet these goals, all of the components in the hot turbine section of such gas turbine engines are coated with protective coatings.

Such coatings are of two general types, aluminide coatings and overlay coatings. Aluminide coatings are produced by diffusion of aluminum into the part to be protected and the reaction of the aluminum with the substrate material to produce intermetallic compounds. In use, the part develops an alumina layer which acts as a barrier to prevent the further oxidation of the coated part. Attempts to use similar silicon based coatings directly on nickel superalloys have been unsuccessful because the nickel-silicon compounds which form have low melting points.

The second major type of coatings are those which are termed overlay coatings. Overlay coatings are themselves oxidation resistant and do not depend upon any reaction with or diffusion into a substrate.

Typical of the more successful overlay coatings are those termed "MCrAlY" coatings where "M" is nickel, cobalt, iron or mixtures thereof. Such MCrAlY coatings are described and claimed in U.S. Pat. Nos. 3,542,530; 3,676,085; 3,754,903 and 3,928,026 which are all assigned to the assignee of the present invention and which are incorporated herein by referencce. Again, such coatings derive there resistance to environmental attack from the formation of an alumina surface layer.

Other types of overlay coatings have been evaluated and have utility in connection with the present invention. These include the MCr type coatings, the MCrAl type coatings and the MCrAlHf coatings (U.S. Pat. No. 3,993,454). In all of these coatings "M" may be iron, nickel, cobalt or mixtures thereof.

A great deal of effort has been expended in the development of coatings which provide environmental stability at extremely high temperatures, for example, 2100° F., and for such high temperature applications, the MCrAlY type coatings are generally unsurpassed.

Some recent work has uncovered an unexpected form of corrosion which occurs at lower temperatures of from about 1200° to about 1400° F. and which reaches a peak in the 1300° to 1350° F. range.

The basic concepts of pack cementation coatings, which are also referred to as diffusion coatings, are presented in an article by R. L. Wachtell found in "SCIENCE AND TECHNOLOGY OF SURFACE COATINGS," published by Academic Press, New York., 1974, pgs. 105 to 119.

An article entitled "STRUCTURE AND PROPERTIES OF SILICIDE BASED DIFFUSION COATINGS" by H. van Amerongen describes certain silicon rich coatings and is found in the book entitled "HIGH TEMPERATURE ALLOYS FOR GAS TURBINES," published by Applied Science Publishers, London, 1978, pgs. 209 to 224.

A further reference to silicon based coatings is found in the preceedings of the "THIRD INTERNATIONAL CONFERENCE ON CHEMICAL VAPOR DEPOSITION," Salt Lake City, Utah, April 1972, by P. C. Felix et al. entitled "CVD SILICON COATINGS FOR THE CORROSION PROTECTION OF TURBINE BLADES".

U.S. Pat. Nos. 3,873,347 and 3,874,901 describe coating systems in which aluminide coatings are applied to articles which have previously been coated with an MCrAlY coating.

DISCLOSURE OF THE INVENTION

A coated superalloy article is described as is the method of producing the article. The coated article has a unique resistance to hot corrosion in the relatively low temperature range of 1200° to 1700° F. and finds particular application in gas turbine engines.

The coating comprises an overlay coating selected from the group consisting of MCr, MCrAl, MCrAlY, MCrAlHf alloys (where "M" is Ni, Fe, Co and mixtures thereof). The outer surface portion of this coating is substantially enriched in silicon and contains from about 10 to about 50% silicon.

The silicon rich portion of the coating may be produced by chemical means such as pack cementation process or by vapor deposition means such as electron beam vapor deposition. The silicon rich layer has a thickness of from 10–40% of the total coating thickness.

BRIEF DESCRIPTION OF THE DRAWING

The drawing shows a photomicrograph of an overlay coating having a silicon rich surface zone according to the present invention.

BEST MODE FOR CARRYING OUT THE INVENTION

The present invention is a composite coating system which can protect superalloy articles from oxidation and corrosion, particularly in corrosive environments at moderate temperatures, e.g., 1200°–1700° F. The various methods for applying this coating also form a part of the present invention. In the following description, all compositions are given in weight percent unless otherwise specified.

The coating consists of a first layer of overlay coating based on iron, nickel, cobalt or mixtures thereof, and a surface layer on the overlay coating which has a silicon concentration from about 10 to about 50 weight percent and preferably from 20 to 40 weight percent.

The silicon rich surface layer may be produced by either diffusing silicon into the overlay coating or by applying a second overlay coating having desired silicon concentration.

For aircraft engine applications and other applications where thermal fatigue is a problem, the overlay coating should have a thickness of about 1 to about 10 mils, for other applications, overlay coating thicknesses up to 20 or even 50 mils may be used. The silicon rich layer should constitute from 10 to about 40% of the total coating thickness.

The overlay coating of the invention is based on iron, nickel or cobalt or mixtures thereof. These coatings include, but are not limited to, the MCr coatings where chromium ranges from about 20 to about 45%; the MCrAl coatings where chromium ranges from about 15 to about 45% and aluminum ranges from about 7 to about 15%; the MCrAlY coatings where chromium ranges from about 15 to about 45%; aluminum ranges from about 7 to about 20% and yttrium ranges from about 0.1 to about 5% and the MCrAlHf coatings where chromium ranges from about 15 to about 45%; aluminum ranges from about 7 to about 15% and hafnium ranges from about 0.5 to about 7%. In all of these coatings "M" is selected from the group consisting of nickel, cobalt, iron and mixtures thereof with mixtures of nickel and cobalt being particularly favored.

Of the previously mentioned overlay coatings, those containing aluminum are generally most resistant to high temperature oxidation. Accordingly, if the coating is intended for use in environments where oxidation at high temperatures (above 1500° F.) may be a problem, the aluminum containing overlay coatings are preferred.

Minor additions of other elements may be made of all of these previously described overlay coatings without affecting their basic behavior or their utility as a part of this invention.

Because nickel-silicon compounds have lower melting points than iron and cobalt based silicon compounds, it is preferred that the nickel content be relatively low, where the coated article is intended for use in a high temperature environment (greater than about 1800° F.). Preferably, nickel constitutes less than 50% of the "M" constituent where high temperatures are anticipated.

A variety of application techniques are available for preparation of these overlay coatings. These include physical vapor deposition and plasma spraying or other high temperature powder application methods.

We have had favorable results with physical vapor deposition and this is the preferred application technique. The physical vapor deposition technique is described in connection with the application of the MCrAlY coatings in U.S. Pat. Nos. 3,542,530; 3,676,085; 3,754,903 and 3,928,026.

Briefly, the physical vapor deposition process comprises providing a molten pool of an appropriate composition in a vacuum chamber and holding the article to be coated over the molten pool while heating the molten material so as to cause vaporization. The vapor condenses on the article to be coated.

Usually the article to be coated is also heated to improve coating adherence and is rotated or otherwise manipulated over the pool surface to improve the distribution of the coating.

After applying an overlay coating, several post coating treatments are possible. One conventional process technique which is particularly useful with the MCrAlY coatings involves glass bead peening to densify the coating followed by a 4 hour heat treatment at 1975° F. to promote coating adherence and homogeneity. Such a process is described in U.S. Pat. No. 3,528,861 with respect to iron base coating alloys. Such a post coating heat treatment has not been found to be necessary in the present invention, however, it does not appear to have any adverse effects.

If plasma spraying or other similar coating techniques were employed, the resultant coating could have a higher degree of porosity, and in this case the various post coating treatments such as glass bead peening and heat treatments might be advantageously used to reduce the degree of porosity.

Following the application of the overlay coating and any post coating heat treatment, the silicon rich surface layer is then developed. Two basic application techniques are contemplated.

In the first application technique, pack cementation, a silicon rich granular pack material is employed. The pack material contains silicon carbide, silicon metal or a silicon rich alloy, an activator such as $NH_4Cl$, $NH_4F$ or NaCl and an inert filler material such as alumina. The parts to be coated are embedded in the pack material and are then heated at a temperature from about 1500° to 2000° F. for an appropriate period of time during which the silicon is transported by the activator to the surface of the overlay coating to form the desired silicon rich layer. During the pack treatment, the silicon diffuses into the overlay material to form a silicon rich layer.

A similar coating technique but one which is more readily adapted to produce a wide variety of different coatings is physical vapor deposition, the same process previously described with regard to application of the overlay coating.

In this process, a pool of molten silicon is provided in a vacuum chamber, and the article to be coated is held over the silicon pool where it comes into contact with the silicon vapor which condenses onto the article which is preferably heated. The condensed silicon diffuses into and reacts with the article as described above with regard to the pack deposition process.

In the actual silicon vapor deposition coating process employed, it was found that holding the overlay part over the pool of molten silicon for a period of 15 minutes resulted in the deposition of 0.5 mil of silicon.

During this time, the substrate temperature was maintained at about 1750° F. to promote diffusion and coating adherence. Following the deposition of the silicon rich surface layer, the coated part was heat treated at 1850° F. for either 15 or 30 minutes to promote further diffusion of the silicon into the overlay coating. A more adherent coating, about 1 mil thick, was obtained after 30 minutes and is the preferred treatment time.

It is also anticipated that this vapor deposition technique could be used to apply a silicon rich alloy to the surface of the previously deposited overlay coating. Such a silicon rich surface alloy would contain about 10 to about 50% silicon with the balance of the alloy being rich in nickel, cobalt or iron or mixtures thereof preferably being similar in composition to that of the underlying overlay coating. Again, the nickel content is preferably held to a minimum if high temperature service conditions are anticipated.

The invention may be better understood through reference to the Figure. A nickel superalloy having a nominal composition of 9% chromoum, 10% cobalt, 2% titanium 5% aluminum, 0.15% carbon, 12.5% tungsten, 1% columbium, 0.015% boron and 2% hafnium was provided with a 5.2 mil thick overlay coating of an alloy consisting of 18% chromium, 12.5% aluminum, 46% nickel, 23% cobalt and 0.5% yttrium.

A physical vapor deposition technique was used to apply silicon to the surface of the overlay coating so as to produce a 1 mil thick silicon rich layer. This is clearly visible in the Figure.

An electron beam microprobe was used to analyze the major constituents of the resultant coating at various points and the following results were obtained:

a. silicon enriched outer layer; 24% silicon, 14% chromium, 43% nickel, 1.9% aluminum and 16% cobalt;

b. silicon enriched reaction zone; 20% silicon, 11% chromium, 44% nickel, 6.4% aluminum and 18% cobalt;

c. an silicon+aluminum+chromium enriched zone; 12% silicon, 21% chromium, 36% nickel, 15% aluminum and 15% cobalt; and d. base overlay coating, silicon less than 0.2%, 18% chromium, 46% nickel, 12.5% aluminum and 23% cobalt.

These compositions correspond to the points indicated in the Figure. It can be seen that the silicon decreases with increasing depth beneath the surface, and there are some changes in composition as a result of the combined inward reaction of silicon and outward reaction of the overlay coating constituents.

Of course, those skilled will appreciate that the entire article need not be coated. In certain applications only a portion of the article may be subject to corrosive attack and only these portions need be coated. Various masking techniques known in the art may be employed.

The portion of the overlay coating which is not rich in silicon appears to be important to the success of the coating. Alloys based iron, nickel, and cobalt containing large amounts of silicon are brittle. Brittle coatings are prone to crack in service and there is always a concern that coating cracks may propagate inwards and cause eventual failure of the substrate. The previously described silicon-free overlay coatings are relatively ductile, and it is believed that any cracks which originate in the silicon rich zone will have difficulty propagating through the ductile layer to reach the substrate. Silicon has also been observed to be detrimental to nickel base superalloys, causing the formation of weak, brittle, low melting phases. By interposing the overlay coating between the silicon rich zone on the substrate, these possible adverse reactions, between the silicon rich layer and the substrate, are minimized.

EXAMPLE 1

A nickel base superalloy was coated with a 4 mil coating of NiCoCrAlY material containing 15% chromium, 25% cobalt, 11.5% aluminum, 0.7% yttrium, balance nickel. The previously described electron beam vapor deposition technique was used to apply silicon to the surface of this NiCoCrAlY coating. Conditions were such that a 1 mil thick surface layer containing about 22% silicon was produced.

A test specimen having this coating system was tested at 1300°–1350° F. in a hot corrosion test using a burner rig with additions of sea salt and $SO_2$ to accelerate corrosion. Also tested were an unsiliconized NiCoCrAlY (18% Cr, 24% Co, 14% Al, 0.2% Y, balance nickel) coated superalloy sample and an unsiliconized superalloy sample coated with a silicon containing NiCoCrAlY composition (18% Cr, 24% Co, 10.3% Al, 0.1% Y, 2.6% Si, balance Ni) containing 2.6% silicon homogeneously dispersed throughout as described in U.S. Pat. No. 4,034,142. The results were as follows: after 470 hours both of the unsiliconized NiCoCrAlY specimens had completely failed. Corrosion attack penetrated the entire 4 mil thickness of the coatings and caused substrate damage. After 1800 hours, the siliconized NiCoCrAlY displayed only about 0.5 mil of attack. Considering both the amount of corrosion attack and the time involved, siliconizing reduced the degree of corrosion by about 340%. This clearly demonstrates the surprising and unexpected advantage of the present invention at resisting hot corrosion at intermediate temperatures.

EXAMPLE 2

Cast specimens of Ni 30 Cr 8 Al alloy were obtained. The cast Ni 30 Cr 8 Al alloy sample represented the overlay coating and there was no superalloy substrate. One sample was siliconized using a physical vapor deposition process to produce a silicon rich surface layer having a thickness of 0.6–0.9 mil and a silicon concentration of 10–16%. This siliconized sample was tested in a burner rig at 1650° F. along with an unsiliconized sample. Additions of sea salt and $SO_2$ were made to increase the severity of the test. The results were as follows: after 353 hours of testing, the unsiliconized sample had corrosion attack to a depth of 80 mils. The siliconized sample showed only 0.7 mil of attack after 1521 hours of testing. Taking the testing time and degree of attack into account, the siliconized surface layer is seen to provide a reduction of 400–500 X in corrosion attack under these test conditions.

EXAMPLE 3

A superalloy test specimen having a nominal composition of 8% Cr, 10% Co, 1.0% Ti 6% Al, 1% Mo, 4.3% Ta, 0.1% C, balance Ni, was provided with an overlay coating having a composition of 15.5% Cr, 10.7% Al, 0.4% Y, balance Co. Another test specimen of the same alloy was provided with a similar overlay coating having a composition of 18% Cr, 12% Al, 0.5% Y, balance Co. Both overlay coatings were applied by an electron beam physical vapor deposition process.

A second coated sample was siliconized using a pack cementation process. A pack material consisting of 19% Si powder, 1% $NH_4Cl$, balance $Al_2O_3$ was employed. The overlay coated sample was embedded in this pack material and was heated at 1600° F. for 6 hours. The sample was then removed from the pack and heated to 1800° F. for 4 hours in an argon atmosphere. The resultant silicon rich surface layer contained about 25% Si and was about 1 mil thick.

These coated samples were evaluated in a burner rig operated at 1300°–1350° F. with additions of sea salt and $SO_2$ to accentuate corrosion. The following results were observed: after 36 hours the unsiliconized sample showed 2.2 mils of corrosion attack while after 599 hours the siliconized sample displayed only 1.75 mils of attack. In this example, the siliconized surface provided a 20 X reduction in corrosion attack.

What is claimed is:

1. A coated superalloy article having enhanced resistance to hot corrosion which comprises:
   a. superalloy substrate;
   b. a thin adherent overlay coating, on the substrate, of a material selected from the group consisting of MCr, MCrAl, MCrAlY and MCrAlHf where "M" is selected from the group consisting of Fe, Ni, and Co and mixtures thereof;
   c. a silicon enriched layer at the surface of the overlay coating having a thickness from about 10 to about 40% of the total coating thickness and having a silicon concentration of from greater than 10 to about 50%, balance selected from the elements which makeup the overlay coating with substantially all of the elements in the overlay coating being present.

2. An article as in claim 1 wherein the overlay coating contains aluminum.

3. An article as in claim 1 wherein the "M" (selected from the group consisting of Ni, Fe and Co) is less than about 50% Ni.

4. An article as in claim 1 wherein the silicon content of the surface layer is from about 20 to 40%.

5. An article as in claim 1 wherein the total coating thickness is from about 1 to about 50 mils.

6. An article as in claim 1 wherein the total coating thickness is from about 1 to about 10 mils and the coating is resistant to thermal fatigue.

7. An enriched layer as in claim 5 wherein the silicon rich surface layer contains from about 20 to about 40% silicon.

8. A coated superalloy article having enhanced resistance to hot corrosion which comprises:
 a. superalloy substrate;
 b. a thin adherent overlay coating, on the substrate, of a material selected from the group consisting of MCr, MCrAl, MCrAlY and MCrAlHf where "M" is selected from the group consisting of Fe, Ni, and Co and mixtures thereof;
 c. a silicon enriched layer at the surface of the overlay coating having a thickness from about 10 to about 40% of the total coating thickness and having a silicon concentration of from about 20 to about 40%.

* * * * *